INVENTOR.
Richard T. Erban

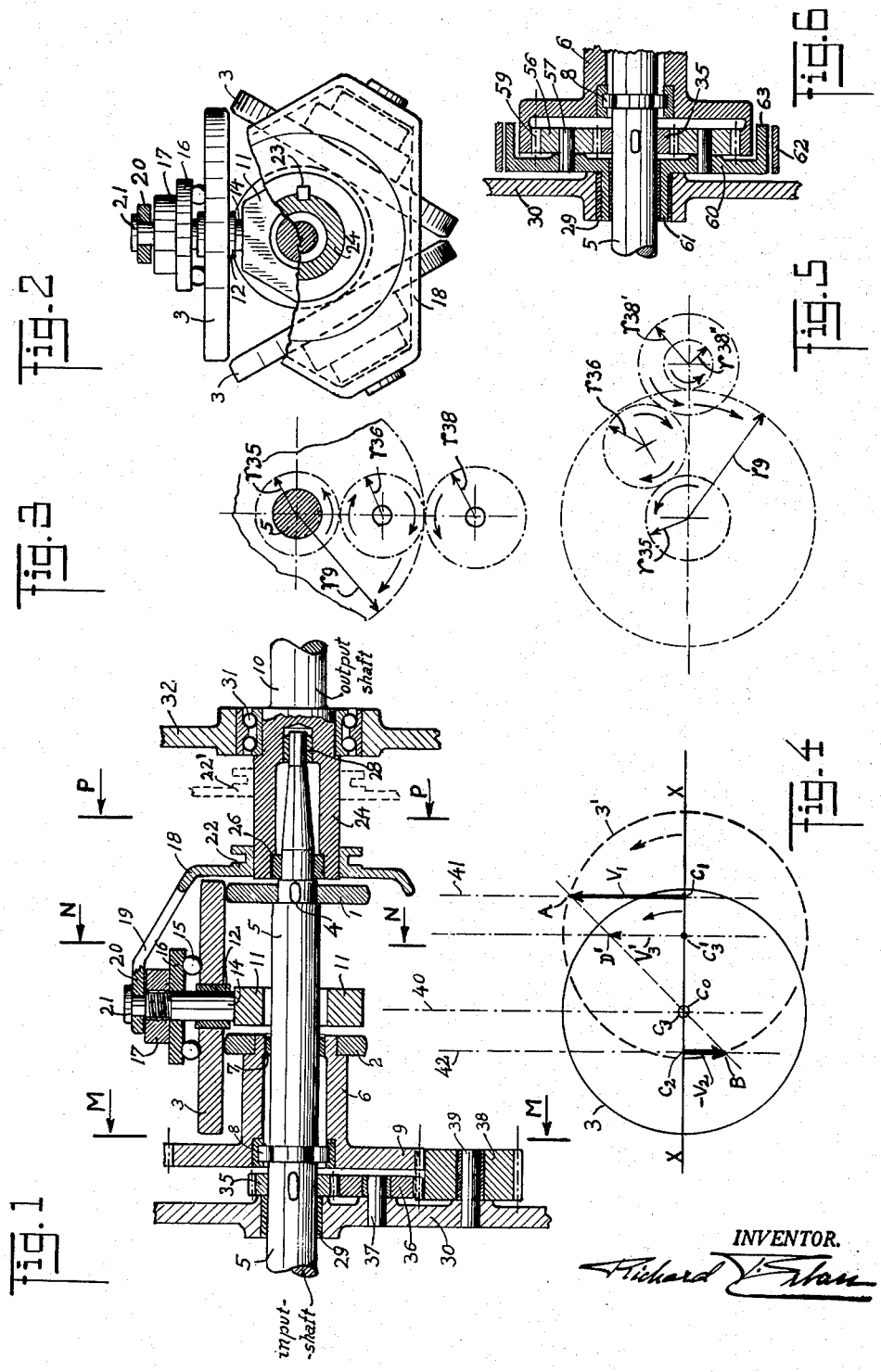

July 13, 1965
R. T. ERBAN
3,194,088
VARIABLE RATIO TRANSMISSION
Filed Feb. 11, 1963
3 Sheets-Sheet 3
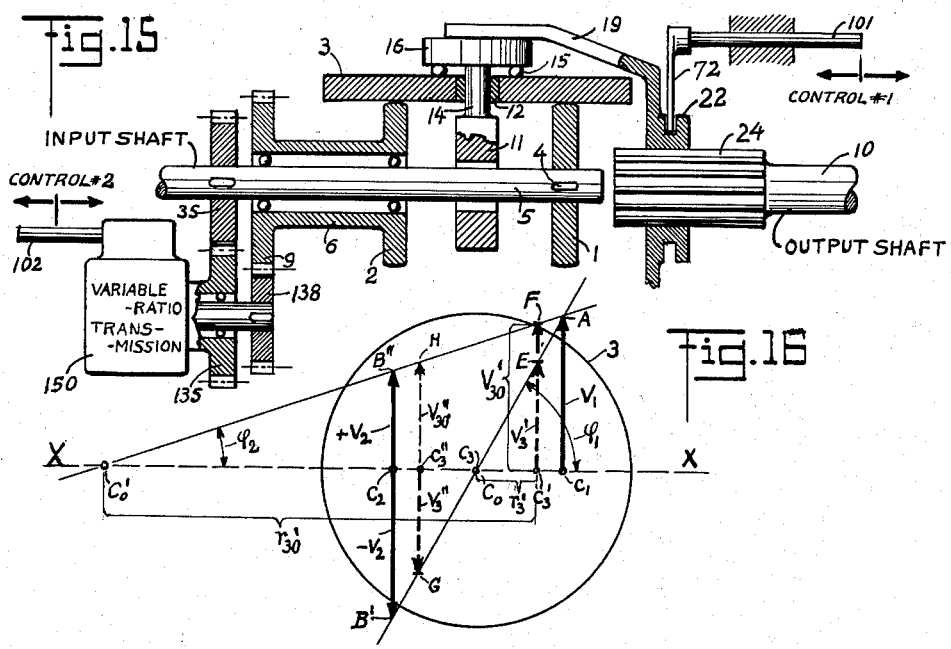
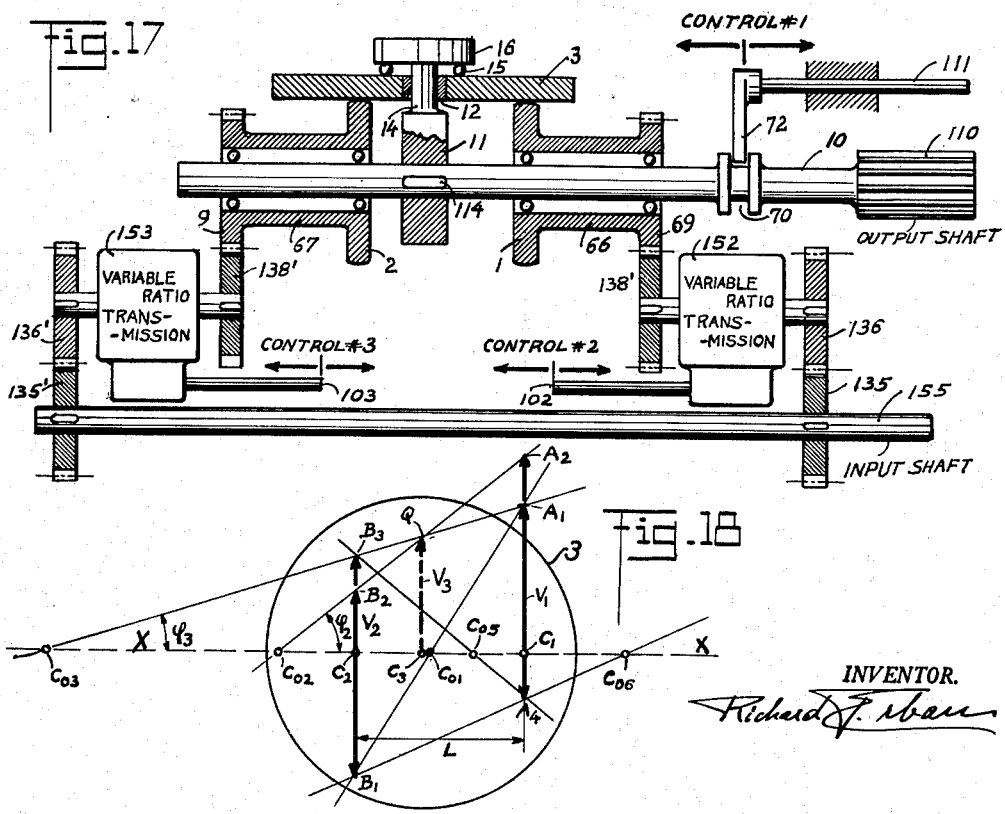
INVENTOR.
Richard T. Erban

United States Patent Office 3,194,088
Patented July 13, 1965

3,194,088
VARIABLE RATIO TRANSMISSION
Richard T. Erban, 145—38 Bayside Ave.,
Flushing 54, N.Y.
Filed Feb. 11, 1963, Ser. No. 257,597
17 Claims. (Cl. 74—691)

This invention relates in its general aspect to variable speed transmissions in which power is transmitted by the tractive forces of rolling contacts between the peripheries of coaxially spaced races or wheels and the surface of rotatable discs positioned around and pressed against the preipheries of the wheels.

In known devices of this type the driving shaft is in most cases connected to one of the coaxial wheels and the driven shaft is connected to the other. The output speed can be selected and varied between a maximum which is above the input speed and a minimum which may be as low as a fraction of the input speed but which is always greater than zero. These transmissions have therefore a limited ratio range and it is not possible to transmit anything but insignificant amounts of power at or even near zero speed because zero speed requires the driven wheel to be positioned at the center of the disc surface where no proper rolling action can take place. The ensuing rubbing friction between the disc center and the wheel periphery causes heat, rapid wear and progressive destruction of the contacting surfaces.

To avoid these difficulties, it has been proposed to combine such a transmission of limited range with a differential gear system by connecting one each of the orbit gears of the differential to one each of the two wheels of the variable speed system, and connecting the planet carrier of the differential to the output or driven shaft. This combination has an infinite ratio range and permits to maintain output speeds at zero or near to it without encountering the aforementioned defects through rubbing friction at the center of the discs. However, as a result of the circulation of power between the differential gear and the wheel-disc system which takes place at high internal rotational speeds there are considerable frictional losses over a part of the ratio range which cause heat and which reduce the accuracy of maintaining a predetermined speed ratio under load conditions, and this is detrimental in the application of such systems in servo-control-mechanisms as well as for Integrators. A further drawback is the fact that the characteristic of control motion versus speed ratio is a hyperbolic function, non-symmetrical with respect to the point of zero speed and of different sensitivity to both sides of zero. In many control mechanisms it is greatly desired to have a straight-line characteristic of uniform sensitivity and symmetrical to the zero point. The relatively high cost of a differential gear system plus the fact that changes of the scope or extension of the ratio-range cannot be obtained without replacing practically the entire differential system are additional disadvantages of these combination systems.

It is therefore an object of this invention to create a structure for a variable speed transmission comprising a pair of co-axial wheels and at least one disc in tractive rolling contact therewith, which will without the use of a differential or planetary gear system provide a control over the output speed through a speed range that includes zero speed and even reversing of the output speed by stepless ratio change. A further object is to create a structure which does possess a straight-line control characteristic, that is, a control where the output speed is in straight line-through-zero proportionality with respect to the shifting motion of the control member. The shifting motion of the control member is the axial displacement of the disc with respect to the positions of the co-axial wheels.

A still further object is a structure in which the elements complementing the basic wheels and disc system are of simple design, economical to manufacture, and so arranged that they can easily be interchanged for the purpose of altering the scope of the ratio-range of the transmission at a minimum of cost.

A still further object is a transmission system in which the full length of shifting movement produces a reduced amount of variation of the output speed, that is, a change of output speed of perhaps 5% or less with respect to the input speed so that the accuracy of speed control is very substantially increased while maintaining at the same time a straight-line characteristic of the speed control. It is also among the objects of this invention to provide a variable ratio transmission system in which the rate of ratio change (the ratio change obtained by a given amount of control motion) may be modulated by additional control means which are operable independently of the basic shifting motion and during the operation of the transmission system under load conditions.

These objects, and some others which will hereafter be pointed out, are obtained through novel structures which are illustrated by way of examples in the drawings attached hereto in which FIG. 1 is a longitudinal section through an embodiment of my invention.

FIG. 2 is a transverse sectional view taken along the line P—P of FIG. 1 looking in the direction of the arrows, the upper portion being broken away and shown in section taken along the line N—N.

FIG. 3 is a schematic view of a section along M—M of FIG. 1.

FIG. 4 is a schematic diagram illustrating the conditions of speed and motion on the face of the disc 3 in FIG. 1 as seen from below.

FIG. 5 is a schematic diagram of a gear train similar to that of FIG. 3, showing only the pitch circles.

FIG. 6 illustrates in longitudinal section a special gear train which includes a clutching device.

Figure 7:
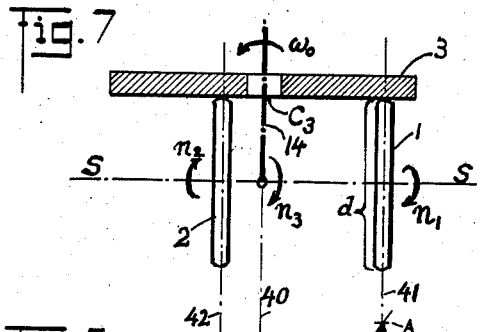
FIG. 7 illustrates schematically a longitudinal view of the relative positions of the basic elements of the transmission shown in FIG. 1.
Figure 8:
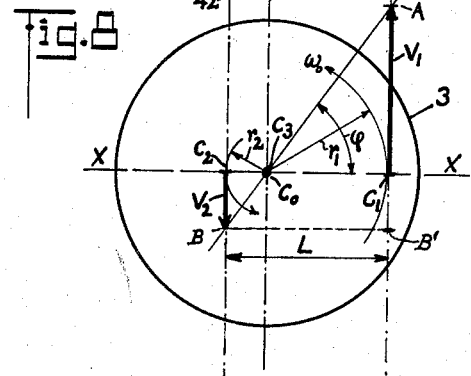
Figure 9:
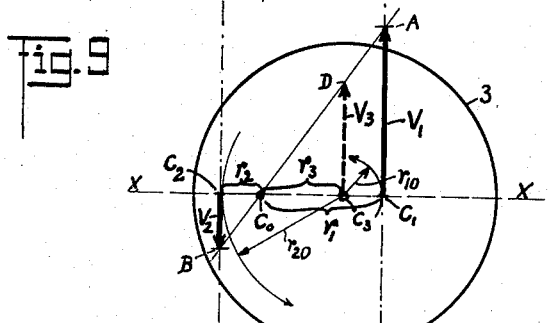
Figure 10:
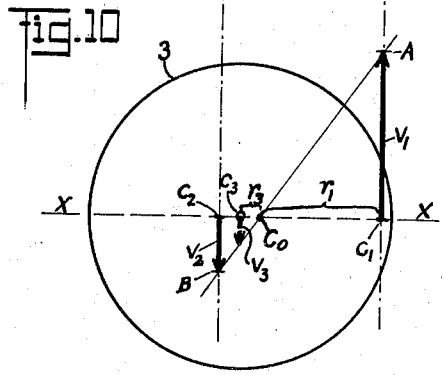

FIGS. 8, 9 and 10 are schematic views as seen from below of the disc 3 in FIG. 7 illustrating the speed diagrams for three distinct axial positions of the disc with respect to the positions of the wheels 1 and 2.

Figure 11:
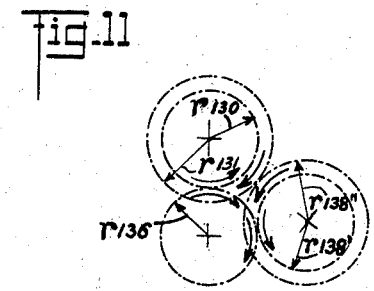
Figure 12:
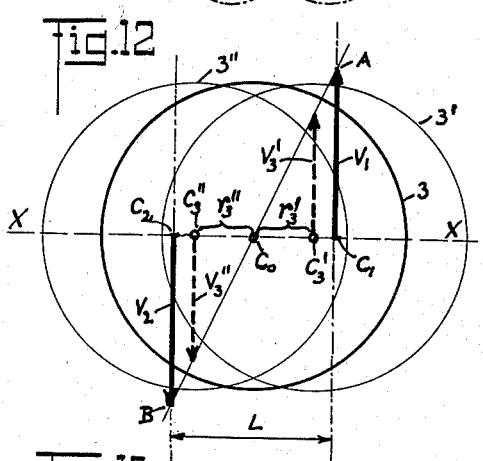

FIGS. 11 and 12 show respectively the diagram of the gear train driving the wheel 2 and the speed diagram for various positions of the disc 3 when wheel 2 is driven by the gear train, FIG. 11.

Figure 13:
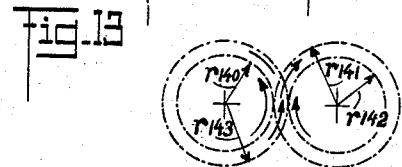
Figure 14:
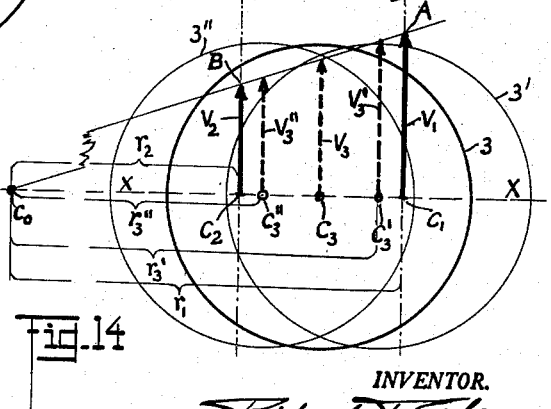

FIGS. 13 and 14 are respectively a diagram of the gear train and the speed diagram obtained when wheel 2 is driven by gear train of FIG. 13.

FIG. 15 illustrates schematically a longitudinal section of a structure in which the output speed is controlled by the basic shifting means and modified by an additional control parameter.

FIG. 16 illustrates various speed diagrams obtainable by the system shown in FIG. 15.

FIG. 17 illustrates schematically a longitudinal section of another embodiment of my invention which includse two additional control parameters.

FIG. 18 illustrates some of the speed and control characteristics that may be obtained by the structure shown in FIG. 17.

Inspection of FIG. 1 discloses that the input shaft 5 is in permanent driving connection with both of the co-axial wheels 1 and 2 respectively so that the rotational speed of each of these wheels is at all times controlled by the driving shaft. There are established two branches of power flow, one between the shaft 5 and the wheel 1 through the key 4, and the other between the shaft 5 and the wheel 2 through the gear train 35–36–38–9. The gear 35 is keyed to the shaft 5 and the gear 9 is in torque transmitting connection with the wheel 2 through the rotatable sleeve 6. The gears 36 and 38 are freely rotatable upon their respective shafts 37 and 39 and serve as transfer gears between gear 35 and gear 9, modifying the speed and direction of rotation between gear 35 and gear 9 in predetermined relationship.

This gear train is schematically shown in FIG. 3 where only the pitch circles are drawn, substantially as they would appear in a section of FIG. 1 along M—M. If the shaft 5 is supposed to be rotating clockwise when observed from the end of the shaft at the left side, then the gear 35 when seen from M—M will appear rotating counter-clockwise. This is indicated in FIG. 3 by an arrow. The size of the pitch circle of gear 35 is marked by the radius $r35$ in FIG. 3, the radius of the pitch circle of gear 9 of FIG. 1 is marked $r9$ in FIG. 3, and similarly the other gears in FIG. 3 are identified by the radii of their pitch circles $r36$ and $r38$ respectively. Inspection of FIG. 3 shows that the gear 36 rotates clockwise and since it meshes with gear 38 this latter rotates counter-clockwise. The peripheral speed of gear 38 is still the same as that of gear 35, and this is transmitted to gear 9 which rotates clockwise, that is, opposite to gear 35, and at a reduced speed of rotation. If $n_{35}$ is the rotational speed of gear 35, and similarly $n_9$ is the rotational speed of gear 9, this speed $n_9$ is given by $$n_9 = \frac{r35}{r9} \cdot n_{35}$$

The pitch radius $r38$ does not alter or modify the speed transmitted from gear 35 to gear 9. The idler gear 36 likewise does not alter the transmitted speed, but in order to mesh the other gears it must have a pitch radius $r36$ determined by $$r36 = \frac{r9 - r35}{2}$$

It is seen from FIG. 1 and FIG. 3 that the wheel 1 rotates at the speed of the shaft 5 and that the wheel 2 is driven at a smaller speed which is illustrated as approximately ⅓ of the speed of the input shaft 5; this relation is the same for the FIG. 1 up to and including FIG. 10 of the drawings; also, in all of these named figures the wheel 2 rotates in a direction opposite to that of the wheel 1. Referring again to FIG. 1, the wheel 2 is fastened to the sleeve 6 which in turn is journalled by means of the bearings 7 and 8 upon the input shaft 5. The bearing 8 is of a design which locates the sleeve 6 axially with respect to the shaft 5. The left end of the sleeve 6 extends into a flange that carries the gear 9. Contacting the peripheries of both wheels are three discs or differential wheels 3 each of which is rotatably supported by an individual bearing 12 mounted on a radial stub-axle 14 extending from a hexagonal carrier or a central hub 11. The shaft 5 passes freely through a central opening of the carrier or hub 11.

Each disc 3 is provided on its outer side with a thrust bearing comprising the balls 15 and the ball-race 16. An adjustable nut 17 is threaded upon an extension of the axle 14 for adjusting the axial position of the thrust bearing 15, 16, together with the disc 3 radially inwardly towards the peripheries of the wheels 1 and 2 in order to maintain the correct amount of pressure in the contacts which is required to transmit tractive forces through the rolling contacts between the wheels and the disc.

Only one such disc 3 is shown in FIG. 1 although the transmission has three discs 3 as illustrated in FIG. 2. It is understood that in order to equalize the pressure of the rolling contacts a plurality of discs uniformly spaced along the periphery of the wheels may be used. This balancing of radial contact pressures is highly desirable and has been described in previous patents including my U.S. Patent 2,057,482.

The hub or carrier 11 which has one radial arm for each of the discs 3 is freely rotatable about the longitudinal axis of the shaft 5, and is connected to the output shaft 10 by three arms 19 of the flange 18. The hub 22 which forms part of the flange 18, is slidable axially upon the hollow sleeve 24, an extension of the shaft 10. A key 23 (or suitable splines upon 24) transmits the torque from the hub 22 to the sleeve 24 and the shaft 10. A bearing 31 positioned in the housing wall 32 supports the shaft 10. Pilot bearings 26 and 28 support the right side end of the input shaft 5 from the hollow end of shaft 10. The left side end of shaft 5 is supported through the bearing 29 from the housing wall 30. This housing wall also carries the shafts 37 and 39 respectively of the transfer gears 36 and 38.

Referring now to FIG. 4, which is a diagrammatical view of the disc 3 of FIG. 1 as seen from below, the contact between wheel 1 and the surface of the disc is denoted $C_1$, and similarly, the contact of wheel 2 is denoted as $C_2$. The center of the disc 3 is denoted $C_3$. The straight line which extends through these three points is marked X—X. The lines 41 and 42 indicate the traces or intersection lines of the central planes of rotation of wheel 1 and wheel 2 respectively with the plane of the surface of disc 3. The line 40 is the trace of a plane which contains the geometric axis of rotation of the disc 3 and is perpendicular to the surface of the disc 3. It is now possible to indicate the peripheral (or linear tangential) speed of the wheel 1 in the contact point $C_1$ by the vector $V_1$ which extends from $C_1$ to the point A. Since it was assumed heretofore that the shaft 5 and the wheel 2 rotate clockwise as seen from the left end, it follows that the upper portion of the periphery of wheel 1 (in FIG. 1) moves out of the plane of the drawing towards the eye of the observer. In the third angle projection of FIG. 4, this direction is represented by the vector $V_1$ going up from the axis X—X. The tangential contact speed of the wheel 2 is then going in the opposite direction, that is, downwards from the axis X—X in FIG. 4 and illustrated by the vector $-V_2$ extending from contact point $C_2$ to B. The relative length of $V_2$ with respect to $V_1$ represent the speed reduction between the shaft 5 and the wheel 2 and corresponds to the ratio between the pitch radii $r35$ and $r9$ respectively.

For the purpose of the following explanation of the operation it is now assumed that the disc 3 with its central opening and bearing 12 is temporarily replaced by a flat plate having its surface in the same position as the disc 3 was, this plate being so supported that it is able to rotate about any point of its surface and also to move in any direction parallel to its surface. This plate is now contacted by the two wheels 1 and 2 in the contact points $C_1$ and $C_2$ respectively. These two points ($C_1$ and $C_2$) determine a straight line X—X. The point $C_1$ which belongs to the plate surface is now subject, through the rotating periphery of the wheel 1, to a traction force in the direction of the vector $V_1$ and therefore tends to move in the direction and with a speed corresponding to the vector $V_1$. This motion is at right angles to the axis X—X and upwards from $C_1$. Similarly the point $C_2$ which belongs to the plate surface tends to move in the direction and with the speed determined by the vector $-V_2$. It is seen that all surface points upon the line X—X near the point $C_1$ tend to move upwards while the points near the point $C_2$ tend to move downwards. Since the direction of movement of all these points are parallel to each other (all are perpendicular to the line X—X) and since the individual speeds vary in value from a positive to a negative maximum, it follows that between the two extreme positions $C_1$ and $C_2$ there must be a point $C_0$ where the motion changes its direction from positive to negative and the speed at right angles to the line X—X is zero. Further, since no motion has been imposed upon the plate surface in either direction lengthwise with the line X—X, it follows that the point $C_0$ has no motion either at right angles to the line X—X nor parallel to it. The point $C_0$ therefore has no lateral motion in any direction and stands still, it is a pole, or epicenter, around which the plate surface rotates counter-clockwise, driven upwards at the right side of the center by the forces of the vector $V_1$ and driven downwards at the left side of the center by the forces of the vector $V_2$. It is to be noted that this epicenter is not established or determined by any material axis that forms part and is located at any point of the surface of the plate. Its position upon the plate surface is determined solely by the position of the two contact points $C_1$ and $C_2$ and by the direction and size of the force vectors transmitted to the surface in these two points. If these two contact points are displaced across the surface of the plate, while keeping their relative spacing as well as the direction and size of the force vectors acting in these two points, the epicenter will move with the displacement of the contact points always keeping its same relative position with respect to the contact points $C_1$ and $C_2$. The exact position of the epicenter $C_0$ is the intersection of the line X—X with a straight line connecting the end points A and B of the speed vectors $V_1$ and $V_2$.

It has been shown heretofore that under the conditions as illustrated in FIG. 4 the epicenter has no motion either along the line X—X or at right angles thereto. If we now replace the substituted freely movable theoretical plate by the original disc 3, and place it so that its geometrical center $C_3$ coincides with the position of the epicenter $C_0$, it will be seen that the disc 3 rotates around its geometrical center $C_3$ (with stub-axle 14) while the center $C_3$ remains stationary, having no motion lateral to the line X—X, nor parallel to it.

Now, if as a next step, the geometrical center $C_3$ of the disc is displaced along the line X—X, so that it is at a definite distance from the epicenter $C_0$, this places the geometrical center $C_3$ in a part of the plane surface which is subject to forces acting at right angles to the line X—X due to the rotation of the plane surface around the epicenter. If the disc center $C_3$ finds itself between the epicenter $C_0$ and the point $C_1$, the direction of motion imparted to the center $C_3$ will be upwards from the line X—X while for positions of the center $C_3$ to the left of the epicenter the direction of motion will be downwards from the line X—X. The force tending to move the disc center $C_3$ laterally with respect to the line X—X causes the disc 3, its bearing 12 and its axle 14 to rotate about the axis S—S (FIG. 7), which is also the geometric axis of the shaft 5 in FIG. 1. The linear tangential speed of the disc center $C_3'$ (FIG. 4) with the disc in the postion denoted 3' (FIG. 4) is obtained as the length of the speed vector $V_3'$ from the point $C_3'$ to point $D'$, measured in the same scale as the speed vectors $V_1$ and $V_2$. The number of revolutions of the disc center $C_3$ together with the disc and its bearings 12 and 15–16 around the geometrical axis of shaft 5 (the axis S—S in FIG. 7) is found as the linear tangential speed ($V_3'$ in FIG. 4) divided by the circumference of the circular path of the center $C_3$ around the axis S—S (FIG. 7). Since the center $C_3$ lies in the plane of the surface of disc 3, the distance of the point $C_3$ from the geometrical axis S—S is the same as for the points $C_1$ and $C_2$, and the circumference is of the same length for all these points. Therefore, the length of the vector $V_3'$ expresses at the same time linear tangential speed in the scale of vector $V_1$ and rotational speed in the same scale as vector $V_1$ when it is considered as representing the rotational speed of the wheel 1. The vector $V_3'$ is therefore a measure of the speed $n_3$ of the output shaft 10. FIG. 4 shows an arbitary position 3' for the disc 3 with its physical center at $C_3'$. The relations resulting from various positions of the disc center along the line X—X will be more fully discussed on hand of FIGS. 7 to 10 inclusive, under the condition that the two vectors $V_1$ and $V_2$ remain unchanged as to their size, direction and spacing from each other.

Referring to FIG. 5, there is illustrated a gear arrangement for the driving connection between wheel 2 and the shaft 5 which provides for a wider choice of available gear ratios than the arrangement shown in FIGS. 1 and 3. The arrangement is different from that of FIG. 3 in that the gear $r38$ of FIG. 3 is replaced by a gear with two different pitch radii, $r38'$ and $r38''$ respectively. The speed of the gear $r9$ is given by $$n_9 = \frac{r35 \times r38'}{r9 \times r38''} \cdot n_1$$

where $n_1$ is the rotational speed of gear 35 and shaft 5. The direction of rotation of each of the gears is again indicated by arrows and gear 9 rotates in opposite direction to gear 35 (and shaft 5).

FIG. 6 illustrates a specific gear train adapted to be operable as a clutch whereby the shafts 5 and 10 may be completely separated from each other, a feature that is desirable when it is necessary to change the transmission ratio to a predetermined value while the output shaft is held at zero speed. This is achieved by providing a separate flange 60 which carries the shafts 57 of the transfer gears 56 that transmit power between the gear 35 and 59. As long as this flange 60 is stationary, the operation of this gear train produces the same results as that of the gear train shown in FIG. 1. The flange 60 is rotatably journalled by its hub 61 in the bearing 29 of the housing wall 30, and it is held stationary by the brake band 62 acting upon the rim 63. When the brake 62 is released, the transmission of power between the shaft 5 and the wheel 2 is interrupted and the shaft 5 is free to rotate without transmitting any motion or power to the shaft 10. It is to be noted that the arrangement of gears as illustrated in FIG. 6 which includes an internal gear 59 does not provide the flexibility of obtaining a very large number of different ratios between shaft 5 and the sleeve shaft 6 (that is, the wheel 2), while in the preferred form of FIG. 1 an almost unlimited number of ratios can be obtained by a simple exchange of idler gears in a manner similar to that of change gears driving the lead screw of a lathe.

FIG. 7 shows schematically the basic elements of FIG. 1, while leaving out the gear train 35, 36, 38, 9 since it is believed that the operation of this gear train, that is driving the wheel 2 at a reduced speed and in opposite direction with respect to wheel 1, is clearly understood from the FIGS. 1, 3, and 5. In FIG. 7 the shaft 5 of FIG. 1 is represented by its geometrical axis S—S. The curved arrows denoted $n_1$, $n_2$ and $n_3$; each arrow is to be taken as passing with its heavy middle portion in front of its respective axis. Thus the wheel 1 rotates clockwise when seen from the left side and has the rotational speed $n_1$ (revolutions per second); the wheel 2 rotates counter-clockwise (as seen from the left) with the speed $n_2$ (rev.p.s.) and the disc 3 rotates around its axis 14 with the angular velocity $\omega_0$ counter-clockwise when seen from below (FIG. 8). The arrow $n_3$ indicates the clockwise revolving motion of the axle 14 and carrier 11 together with the disc 3 (and its thrust bearings shown in FIG. 1) around the axis S—S, the numerical rotational speed being $n_3$ rev. per sec.

FIGS. 8 and 9 correspond to FIG. 4 in that size, direction and spacing of the vectors $V_1$ and $V_2$ is the same. They serve to further explain the operation of the device and also to furnish proof that the output speed varies in straight-line proportion to the relative displacement of the physical center of the disc 3, in axial direction along the line X—X. It has been shown that the position of the epicenter is determined only by the two vectors $V_1$ and $V_2$. In FIG. 8, the position of the center $C_3$ coincides with the epicenter $C_0$ (same as in FIG. 4 for the position of the disc marked 3). Under these conditions the rolling contact $C_1$ describes upon the disc surface a circular path with radius $r1$ and the angular velocity $\omega_0$. Similarly, the contact point $C_2$ describes a circular path with radius $r2$ and the same angular speed $\omega_0$. The relative position of vector $V_1$ with respect to vector $V_2$ as well as their relative sizes are the same as shown in FIG. 4. The position and inclination of the line A–B likewise is the same as shown in FIG. 4.

It has been postulated that there shall be no slipping in the rolling contacts $C_1$ and $C_2$ as between the periphery of the wheels 1 and 2 and the surface of disc 3 respectively. Therefore, in point $C_1$, the tangential peripheral speed of wheel 1 must be the same as the tangential speed of the circular path with radius $r1$, that is, both are $V_1$. Similarly, in the point $C_2$ the speed vector $V_2$ must be the same for the peripheral speed of the wheel 2 and for the tangential speed of the circular path with radius $r2$. The diameter of each of the wheels being $d$, the following conditions obtain:

$$V_1 = \pi d.n_1 = r1\omega_0$$
$$V_2 = \pi d.n_2 = r2\omega_0$$

(note: $V_2$ and $n_2$ should be written as negative for being in opposite direction to $V_1$ and $n_1$. Also, $r2$ as determining the location of $C_2$ with respect to $C_0$ is negative for being to the left of $C_0$).

From the above it follows that $$\omega_0 = \frac{\pi d.n_1}{r1} = \frac{\pi d.n_2}{r2} = \tan \varphi$$

where $\varphi$ is the angle $C_1$—$C_0$—$A$ and also the angle $B'$—$B$—$A$ if $B'$—$C_1$ is made equal to $B$—$C_2$. From this last triangle it is seen further that $$\omega_0 = \frac{\pi d(n_1 + n_2)}{r1 + r2}$$

and since $r1 + r2 = L$, that is the spacing between wheel 1 and 2 (to be accurate, the distance between the respective central planes of rotation of the race tracks at the peripheries of the wheels 1 and 2), we find $$\omega_0 = (n_1 + n_2)\frac{\pi d}{L}$$

or, correctly, since $n_2$ is negative:

$$\omega_0 = (n_1 - (-n_2))\frac{\pi d}{L}$$

This means that the angular velocity of the disc surface about the epicenter is proportional to the algebraic difference of the rotational speeds of the two wheels and inverse proportional to their spacing $L$, their diameter "$d$" being a constant value. In FIG. 9 the physical center of the disc 3 has been moved to the position denoted $C_3$ which is to the right of the epicenter $C_0$, so as to be spaced therefrom by the distance denoted $r3$. The speed vector for the surface speed, $V_3$, is the length $C_3$—$D$ and it is also $$V_3 = r3\omega_0$$

Since $V_3$ is smaller than $V_1$, the difference $V_1 - V_3$ forces the disc 3 to rotate with the angular velocity $\omega_{10}$ about its physical center of rotation or axle center $C_3$; the point $C_1$ describing upon the disc surface a circular path with radius $r10$. The peripheral speed (or tangential speed at the point $C_1$) must be the equivalent of the speed difference $V_1 - V_3$. Therefore $$r10.\omega_{10} = V_1 - V_3 \text{ and } V_3 = r3.\omega_0$$

or $$r10.\omega_{10} = r1\omega_0 - r3\omega_0 = \omega_0(r1 - r3)$$

therefore $$\omega_{10} = \frac{r1 - r3}{r10} \cdot \omega_0 = \omega_0 \cdot \frac{r10}{r10} \text{ since } r1 - r3 = r10$$

and $$\omega_{10} = \omega_0 = (n_1 + n_2) \cdot \frac{\pi d}{L}$$

This means that the angular velocity of the disc 3 around its physical center $C_3$ and its physical axle 14 is constant and is identical with the angular velocity of the disc surface around the epicenter $C_0$, irrespective of the position of the physical disc center with respect to the contact points $C_1$ and $C_2$ between the wheels 1 and 2 and the disc 3. In other words, for a constant input speed $n_1$, the rotational speed of the disc 3, (which is also the speed sustained by the thrust bearing 15–16 in FIG. 1) is constant regardless of the changing output speed of the transmission. This is one of the important features of the new structure according to this invention.

The above formula indicates furthermore that the rotational speed of the disc 3 remains constant even for a changing speed $n_1$ provided that the speed $n_2$ of the wheel 2 is changed simultaneously so that the sum $n_1 + n_2$ remains constant. The rotational speed $n_3$ of the disc with axle 14 and thrust bearing 15, 16 around the axis S—S (FIG. 7) which is also the speed of rotation of the output shaft 10 (FIG. 1) is the linear speed $V_3$ divided by the circumference of the circular path of the center $C_3$ around the S—S.

$$V_3 = \pi d.n_3 = r3\omega_0$$

and $$n_3 = \frac{V_3}{\pi d} = r3 \cdot \frac{\omega_0}{\pi d}$$

since $$\omega_0 = (n_1 + n_2)\frac{\pi d}{L}$$

we find $$n_3 = r3\frac{n_1 n_2}{L} = r3\frac{n_1 + n_2}{r1 + r2}$$

This can also be written as $n_3 = k.r3$ where $$k = \frac{n_1 + n_2}{r1 + r2}$$

The above formula for $n_3$ proves the statement made earlier in connection with FIG. 4, namely, that for a constant input speed $n_1$ the output speed $n_3$ is directly proportional to the radius $r3$ that is, the displacement of the physical center $C_3$ of the disc 3 from the epicenter $C_0$.

When the disc center $C_3$ is displaced to the left of the epicenter $C_0$, as illustrated in FIG. 10, the radius $r3$ must be counted as negative and therefore the output speed $n_3$ is also negative, that is, the output shaft rotates in opposite direction to the input shaft 5.

FIG. 12 illustrates a speed diagram for a structure in which the vector $V_2$ is again in opposite direction to $V_1$ but of the same numerical size. The epicenter, being the intersection of the line A–B with the axis X—X is now located at $C_0$ in the middle between $C_1$ and $C_2$, so that $r1$ is equal to $r2$, or $\frac{1}{2}L$. When the disc is positioned with its center $C_3$ coincident with $C_0$ (position of disc marked in heavy line 3), the disc rotates about the center $C_3$ but this center does not revolve around the axis S—S and the speed of the output shaft is zero. Displacing the disc to the right to the position 3', which the center at $C_3'$, will produce a forward output speed $n_3'$ defined by $$n_3' = n_1 \cdot \frac{V_3'}{V_1} = n_1 \frac{r3' \cdot \omega_0}{r1 \cdot \omega_0} = r3'\frac{n_1}{r1}$$

Displacement of the disc 3 to the left of the epicenter $C_0$ to the position $C_3''$ (disc denoted 3'') will similarly produce a reverse speed "$-n_3$" according to $$-n_3'' = -r3'' \cdot \frac{n_1}{r1}$$

It follows from this formula that the transition from positive to negative output speed follows a straight line characteristic through zero. A structure of this type is therefore well suited for use in an integrating device where a straight proportionality is desired.

A gear train for obtaining a speed vector $V_2$ of equal absolute size but of opposite direction to $V_1$ is illustrated in FIG. 11 in schematical form in the manner of the illustrations of FIGS. 3 and 5. The gear denoted $r130$ replaces the gear 35 on the shaft 5 in FIG. 1 and it meshes with the idler gear r136 which replaces the gear 36 (FIGS. 1 and 3). The idler gear 136 meshes with idler gear r138' which replaces gear r38' in FIG. 5. Rigidly connected to r138' is the gear r138'' which meshes with the gear r131 substituting for gear 9 in FIG. 1 and being connected to the wheel 2. If the ratio of r138'/r138'' is made the same as the ratio r130/r131, the gear r131 (and with it wheel 2) rotates with the same absolute speed but in opposite direction to the gear r130 (and shaft 5 plus wheel 1).

A transmission embodying the basic structure as illustrated in FIG. 12 offers substantial advantages over integrators of the ball and disc type. It possesses a sharply defined zero point and it can be used at this zero point under full load continuously without fatigue or wear due to the destructive rubbing forces which develop at the zero point of ball-disc type integrators.

A still further modification of the basic principle of this invention is illustrated in FIGS. 13 and 14. In this arrangement both wheels 1 and 2 are caused to rotate in the same direction. Inspection of FIG. 14 shows that both speed vectors, $V_1$ and $V_2$ are positive, that is, going in the same direction while being of different absolute value. The contact point of wheel 1 is again denoted $C_1$ and the speed vector $V_1$ goes from $C_1$ to point A. Similarly, the speed vector $V_2$ extends from the contact point $C_2$ to the point B. The axis X—X goes through the points $C_1$ and $C_2$ and the spacing between $C_1$ and $C_2$ is denoted L. The position of the epicenter is again the point of intersection of the line A–B with the axis X—X; since the vector $V_2$ is smaller than vector $V_1$, the intersection point $C_0$ lies to the left of point $C_2$. In the drawing of FIG. 14, in order to save space, the point $C_0$ is shown much nearer to point $C_2$, its correct position would be much farther to the left, and this shortening of the distance is indicated in the drawing by the broken lines A–B–$C_0$ and X—X. The distance $C_0$–$C_1$ is again denoted $r1$ and the distance $C_0$–$C_2$ is denoted $r2$. In previous diagrams which referred to FIGS. 1 and 7 through 11, the radius $r2$ used as the distance $C_0$–$C_2$ measured upon the axis X—X was a negative figure because the distance was to the left of point $C_0$. In the present case of FIG. 14 the radius $r2$ as distance between $C_0$ and $C_2$ is positive because it is to the right of $C_0$. Therefore, the distance or spacing between $C_1$ and $C_2$, marked L (same as previously) is, using the same formula $$L = r1 - r2$$

The linear speed vectors for various positions of the physical disc center $C_3$ upon the axis X—X are again defined by the length of the speed vector between the axis X—X and the line A–B for each individual position of $C_3$ between $C_3'$ and $C_3''$. With the disc center at $C_3$ in the middle between $C_1$ and $C_2$, the speed vector $V_3$ is also midway between $V_1$ and $V_2$, the position of the disc 3 for this position of the center being indicated by a heavy circle marked 3. The distance from $C_3$ to the epicenter $C_0$ is the radius $r3$ which determines the numerical value of $V_3$ as $r3\omega_0$. Similarly, the lowest and highest output speed vector, $V_3''$ and $V_3'$ respectively, are found by multiplying the respective radii with the angular disc velocity $\omega_0$ and in like manner the output speeds can be found using the previously given formulae, provided that it is kept in mind that $r2$, $n_2$ and $V_2$ are now positive as against their former negative value.

Therefore $$n_3' = k \cdot r3' \text{ and } n_3'' = k \cdot r3''$$

where $$k = \frac{n_1 - n_2}{r1 - r2} = \frac{n_1 - n_2}{L}$$

The positions of the disc 3 belonging to the centers $C_3'$ and $C_3''$ respectively are marked by 3' and 3''. The angular speed of rotation $\omega_0$ of the disc 3 around its center and axle 14 are also obtained by the previous formula as $$\omega_0 = (n_1 - n_2)\frac{\pi d}{L} = (n_1 - n_2)\frac{\pi d}{r1 - r2}$$

It follows from this that for small differences between $n_1$ and $n_2$ the disc 3 rotates very slowly around its axis while the output speed $n_3$ may be very close to $n_1$. This indicates that a substantial portion of power is transmitted to the output shaft through the revolving of the disc 3 around the carrier axis S—S (geometrical axis of shaft 5, FIG. 1) and only a smaller portion of power is transmitted through rotation of the disc 3 about its axle 14 and the rolling motion of the wheels upon the disc. The result of these conditions is an extremely high efficiency of power transmission for structures in accordance with this design; in cases where the speed range is limited to a variation of perhaps 10–15% of the output speed, the efficiency of power transmission may reach values of about 98% which is unquestionably a very high figure for a variable speed transmission.

FIG. 13 illustrates a gear train which may be used to provide a speed vector $V_2$ going in the same direction as $V_1$ (that is, positive) and at the same time modified as to its absolute value according to the relation $$V_2 = V_1 \frac{r140 \times r142}{r141 \times r133}$$

Where in most of the foregoing descriptions reference was made to one disc 3 only, it is to be understood that the explanations given apply equally to structures having two, three or more discs arranged surrounding the coaxial wheels 1 and 2 (FIGS. 1 and 3) so as to be in tractive rolling contact with the said wheels. It is further understood that while the foregoing description refers to the pressure imposed upon the rolling contacts substantially perpendicular to the contacting surfaces as being obtained by an adjustable threaded nut 17 (FIG. 1) which transmits through the thrust bearing 15, 16 a radial inwards pressure to the disc 3, this detail is not to be considered an essential part of the new structure; and that any known method or design for obtaining a contact pressure between the disc surfaces and the peripheries of the wheels may be embodied in the structure without in any way altering or changing the basic principle of this invention or its novel operational features; and that such known methods or designs may include devices in which the contact pressure is subject to modification in accordance with the transmitted power, which designs have been described by way of example in my previous U.S. Patent 2,057,482.

FIG. 15 discloses a structure which is in many respects similar to that shown in FIG. 1; identical parts have been given the same reference numbers. A control rod 101 engages through the shifting fork 72 the axially slidable shift collar 22 and this establishes the basic control #1. The difference between FIG. 15 and FIG. 1 resides in the structure of the power transmitting connection between the wheel 2 and the shaft 5. In FIG. 1 this connection is a gear train having a predetermined fixed ratio. In FIG. 15 this connection comprises a transmission system denoted 150 which establishes a predetermined variable ratio between the gears 135 and 138 respectively; gear 135 meshes with gear 35 on shaft 5 and gear 138 meshes with gear 9 which is connected to wheel 2. A control rod 102 which changes the ratio of transmission 150 establishes the control #2 of the entire system and this control #2 may be operated independently of the control #1. While the variable ratio transmission 150 may be of various designs, the speed control diagram shown in FIG. 16 has been constructed with the postulate that the transmission 150 is of the same kind as the transmission illustrated in FIG. 1. (The only difference being that in the transmission 150 both input and output shaft protrude concentrically at one side, which is a minor detail of design not affecting the operation.) The diagram in FIG. 16 illustrates only one group of possible speed characteristics.

It is supposed that the transmission 150 has a ratio range which permits to set the speed vector $V_2$ to any definite value between the limits of plus $V_2$ and minus $V_2$, while the primary vector $V_1$ remains unchanged. It is further postulated that minus $V_2$ has the same absolute value as plus $V_1$, while the maximum value of plus $V_2$ is smaller than plus $V_1$. It is seen from the diagram that when the vector $V_2$ is set to its negative maximum, the speed characteristic for the control #1 delivers output speeds $V_3$ going from plus $V_3'$ through zero to minus $V_3''$, corresponding to an axial shifting displacement of the center $C_3$ of the disc 3 from the point $C_3'$ to the point $C_3''$. This is identical to the speed diagram illustrated in FIG. 12 because the two basic speed vectors, $V_1$ and $V_2$ respectively, are of equal absolute value but of opposite direction. When the control #2 is operated so that $V_2$ changes from its negative maximum through zero to its positive maximum, the output speed $n_3$ (which corresponds to the speed vector $V_3$) also changes, the amount of such speed change depending upon the position of the disc center $C_3$ relative to the contact points $C_1$ and $C_2$. When the disc center is at $C_3'$, the change in output speed will correspond to the change from vector $V_3'$ of the length $C_3'-E$ to the vector $V_{30}'$ with the length $C_3'-F$, both being positive, which means that the output shaft rotates in the same direction as the input shaft. If in another example the disc center is in the position $C_3''$, the output speed changes correspond to the change from vector minus $V_3''$, $(C_3''-G)$ to vector plus $V_{30}''$, $(C_3''-H)$.

It is seen that the position of the line of characteristic, which determines the size and direction of the output speed vector, is given by the points $A-B'$ for one extreme position of the control #2; and that it is given by the points $A-B''$ for the other extreme position of the control #2. The first of these diagrams corresponds to that shown in FIG. 12 and the other to that shown in FIG. 14 respectively. The structure disclosed in FIG. 15 permits therefore to cover with a single unit the control characteristics of both FIG. 12 and FIG. 14, and, in addition, of all characteristics which fall between these two extremes. This change of the characteristic under which the control #1 operates can be effected while the transmission unit is in operation and transmitting power.

From another point of view, the transmission disclosed in FIG. 15 allows the operator to increase the rate of ratio change, that is the change of ratio per increment change of the basic control motion (control #1). The reason for such modulation will be clearer from the following considerations. Where it is desired to control the output speed in very minute increments or steps, it is evidently advantageous to have a control system in which a fairly large amount of control motion produces only a very small amount of change in the output speed. A control device with this characteristic is therefore less sensitive in its response to a given amount of control motion than a device wherein the same amount of control motion produces a greater change in output speed.

If the transmission ratio is defined by $$R = \frac{n_3}{n_1}$$

and $$V_3 = n_3 d\pi$$
$$V_1 = n_1 d\pi$$

then also is $$R = \frac{V_3}{V_1}$$

and if we postulate $V_1$=constant and equal 1 then we have $$R = V_3$$

The increment of the control motion (or control travel) is the change which occurs in the distance $C_0-C_3$. Since $C_0-C_3$ is also $r3$ (the radius of the circular path of the center $C_3$ about the epicenter $C_0$) the increment of the control motion is the increment of the radius $r3$, or $\Delta r3$; if this increment of control motion produces a change $\Delta R$ in the ratio R, a definition for the sensitivity S can be written as $$S = \frac{\Delta R}{\Delta r3} = \frac{\Delta V_3}{\Delta r3}$$

For the point E upon the characteristic $A-B'$ the sensitivity $S_1$ is then $$S_1 = \frac{\Delta V_3'}{\Delta r3'} = \tan \varphi_1 = \frac{V_3'}{r3'}$$

It is apparent that the sensitivity is the same for any point upon the line $A-B'$ because it is a straight line. Therefore it is clear that if the characteristic were a curve, for instance a hyperbolic function, the sensitivity would vary from one point to the next.

It is now postulated that control #1 remains unchanged while control #2 is shifted so that the vector minus $V_2$ changes to plus $V_2$, whereby the point $B'$ moves to the position $B''$. The new characteristic $A-B''$ defines a new epicenter $C_0'$ and the new speed vector, denoted $V_{30}'$, extends from the point $C_3'$ to the point F. It is seen that the sensitivity for this new characteristic $A-B''$ is now $$S_2 = \frac{V_{30}'}{r30'} = \tan \varphi_2$$

Comparison with the previous value shows that the sensitivity has been reduced in the proportion $$\frac{S_1}{S_2} = \frac{\tan \varphi_1}{\tan \varphi_2}$$

Furthermore, the output speed has been changed in the proportion of $$\frac{V_{30}'}{V_3'}$$

so that the new output speed $n_{30}'$ is now $$n_{30}' = n_3' \frac{V_{30}'}{V_{3'}} = \frac{r30' \tan \varphi_2}{r3' \tan \varphi_1} = \frac{r30'}{r3'} \cdot \frac{S_2}{S_1}$$

This change in output speed, or transmission ratio, is objectionable in certain applications where it is desired to change the sensitivity of the control mechanism without however causing any change in the transmission ratio. A structure which answers to these requirements and which incorporates the basic principles of this invention is schematically illustrated in FIG. 17; the speed diagrams pertaining thereto are shown in FIG. 18.

The transmission system comprises again two co-axially spaced wheels, 1 and 2 respectively, the peripheries of which are connected or coupled by the disc 3 which is rotatable upon the axle 14 extending radially and perpendicular with respect to the co-axial shaft 10. The axle 14 is locked to the shaft 10 through the carrier or hub 11 and the key 114. The thrust bearing 15, 16 causes the disc 3 to be pressed against the peripheries of the wheels 1 and 2, in accordance to the disclosure of FIG. 1. Each of the wheels 1 and 2 is freely rotatable upon the common shaft 10, the wheel 1 is carried by a sleeve shaft 66 which at its right end has a gear 69; the wheel 2 is carried by a sleeve shaft 67 which has at its left end a gear 9. The sleeve shafts 66 and 67 are also slidable axially upon the shaft 10 and are held in their axial positions by bearings not illustrated. The shaft 10 is slidable axially without changing the axial location of the wheel 1 and 2; it is provided with a collar 70 and a splined or geared portion 110. The collar 70 is engaged by the shifting fork 72 which can be moved by the control rod 111. This establishes control #1 of the system. The splined portion 110 serves to transmit power from the output shaft independent of its axial position.

The input shaft 155 carries two gears, 135 and 135' respectively. The gear 135 is in power transmitting connection through the gear 136 with one side of the variable speed transmission 152 the other side of which is connected through the gears 138 and 69 to the wheel 1. Similarly, the gear 135' is connected through the gear 136' to the one side of the variable ratio transmission 153 while the other side thereof is through the gears 138' and 9 connected to the wheel 2. The transmission 152 is ratio controlled by the control rod 102 and the transmission 153 by the control rod 103, thus establishing control #2 and control #3 respectively. The transmission system illustrated in FIG. 17 has therefore available three independent control movements, of which #1 is the basic control shifting motion for the axial position of the physical center of the disc (or discs) 3, while the other control motions, #2 and #3 allow for predetermined independent control of speed and direction of rotation of the two wheels 1 and 2 respectively, thereby providing for predetermined modulation of the two speed vectors $V_1$ and $V_2$ according to the diagram FIG. 18. The size of the disc 3 and the spacing of the wheels 1 and 2 are illustrated at the same scale as was used for the previous figures in order to facilitate a comparison between the various diagrams; it is however understood that the spacing L between the wheels 1 and 2 may be made variable and that the axial position of each of the wheels 1 and 2 may be determined individually by separate and additional control means so that a total of five independent control motions are made available for control of the output speed.

The diagram of FIG. 18 clearly shows that even when the two wheels 1 and 2 are spaced axially at a fixed distance L, the epicenter $C_0$ may be moved to almost any position along the axis X—X. In case where speed vector $V_1$ equals $C_1-A_2$ and the vector $V_2$ is equal to $C_2-B_2$, the characteristic $A_2-B_2$ determines the epicenter at $C_{02}$. If under this condition the disc center is at $C_3$, the output speed is represented by $V_3$ equal to $C_3-Q$ and the sensitivity $S_2$ is $$S_2 = \frac{C_1 - A_2}{C_{02} - C_1} = \tan \varphi_2$$

Changing the vector $V_1$ to equal $C_1-A_1$ and the vector $V_2$ to equal $C_2-B_3$ results in a characteristic $A_1-B_3$ with the epicenter at $C_{03}$. This characteristic goes also through the point Q of the speed vector $V_3$ and this means that the output speed $n_3$ remains unchanged. However, the sensitivity of the basic control motion #1 has been changed and is now defined by $$S_3 = \frac{C_1 - A_1}{C_{03} - C_1} = \tan \varphi_3$$

which is obviously smaller than $S_2$. Therefore it is seen that the sensitivity of the control system has been altered, or modulated, during operation of the system without causing any change in ratio or the output speed of the complete system. FIG. 18 further illustrates that the epicenter may be positioned on any point of the axis X—X between $C_{03}$ on the left to $C_{06}$ on the right side by appropriate modulation of the two input parameters $V_1$ and $V_2$.

It is understood that while the foregoing specification and drawings are given as illustrative examples of preferred forms of embodiments of this invention, there are many other forms of structures in which the basic principle of this invention may be carried out. All of these forms comprise as basic elements three co-axially rotatable members, two of which have tracks of identical diameters and are axially spaced from each other, while one is a carrier rotatable about the common axis and supporting at least one disc freely rotatable about a radial axis perpendicularly intersecting the common axis and in traction contact with the periphery of each of the axially spaced members so as to form therebetween a rotatable coupling link, and a driving and a driven shaft one of which is in power transmitting connection with two of said rotatable members, and control means for changing the relative axial position between the radial axis of the disc with respect to the positions of the axially spaced rotatable members.

Having thus described my invention and illustrated its use, what I claim is:

1. A variable ratio transmission comprising two co-axially aligned wheels having peripheral race ways of substantially identical diameters axially spaced from each other, at least one disc mounted rotatable about an axis perpendicular and radial with respect to the geometric axis of said wheels, said disc having a plane surface contacting tangentially said race ways, means adapted to impose pressure upon the contacts between said plane disc surface and said race ways, an axially slidable carrier supporting said perpendicular axis rotatable about said geometric axis of said wheels, means for shifting said carrier and said disc axially with respect to said wheels, a driving shaft and a driven shaft, power transmitting means between both of said wheels and one of said shafts arranged to cause rotation of said wheels with a predetermined relation of speed with respect to each other and means adapted to transmit power between said axially slidable carrier and the other shaft.

2. A variable ratio transmission system, comprising a carrier rotatable about an axis and a plurality of discs having flat surfaces and each disc mounted upon said carrier rotatable about an individual axis perpendicularly intersecting said axis of the carrier so that the flat surfaces of said discs are facing said axis of the carrier at the same distance therefrom while symmetrically surrounding it, two individually rotatable members spaced from each other co-axial with said carrier-axis, each of said members provided with a circular peripheral race surface in tractive rolling contact with said flat disc surfaces, control means for changing the relative axial position between said discs and said peripheral race surfaces of said rotatable members, a driving and a driven shaft, a power transmitting direct connection between one of said rotatable members and one of said shafts, and a modulating power transmitting connection between the same shaft and the other of said members whereby said rotatable members are caused to rotate at a predetermined relation of speed and direction of rotation with respect to each other, and a power transmitting connection between said driven shaft and said carrier.

3. A variable ratio transmission system, comprising a carrier rotatable about an axis, two independently rotatable members coxail therewith and each provided with a peripheral race way of identical diameter with respect to each other, a plurality of discs having flat surfaces parallel to said axis of the carrier, said discs being mounted upon said carrier rotatable about individual axes which intersect the axis of said carrier at right angles thereto and all of said individual axes positioned in a single plane perpendicular to said carrier axis, said flat surfaces of the discs positioned tangentially surrounding said peripheral race ways of said independently rotatable members and in tractive rolling contact with said race ways, means adapted to maintain the required pressure in said rolling contacts, said rotatable members positioned in axially spaced relation to each other in such manner that said race ways are placed on opposite sides of said single plane which contains said individual disc axes, a driving and a driven shaft, power transmitting means between one of said shafts and each of said rotatable members adapted to individually control the respective speed and direction of rotation of each of said rotatable members, and a power transmitting connection between said rotatable carrier and the other of said shafts.

4. In a variable ratio transmission system having a primary control means for changing the transmission ratio and secondary control means for changing the sensitivity of said primary control means, two independently rotatable race ways axially spaced from each other upon a common geometrical axis, at least one disc having a flat surface tangentially contacting said race ways in two tractive rolling contacts and mounted freely rotatable upon an axis which is parallel to the planes of rotation of said two race ways and positioned therebetween in spaced relation to each of said two planes of rotation, a carrier freely rotatable upon said common geometrical axis and adapted to support said disc axis together with said disc rotatable thereon whereby said disc in addition to being freely rotatable upon its own axis is also capable of simultaneous rotation together with said carrier about said common geometrical axis, a primary control means adapted to cause axial displacement of said carrier and said disc relatively to said planes of rotation of said race ways whereby the respective distances between said disc axis and said planes of rotation of the race ways are inversely changed, a driven shaft connected to said carrier, a driving shaft, two power transmitting connections including variable speed control means interposed between said driving shaft and each one of said race ways respectively, said last named control means being operable independently of said primary control means at a predetermined relation to each other whereby the sensitivity of said primary control means may be altered without affecting the ratio defined by the setting of the primary control means.

5. A variable ratio transmission system comprising a driving and a driven shaft, two co-axially spaced rotatable raceways of substantially equal diameters, power transmitting means arranged between one of said shafts and both of said raceways respectively whereby said raceways are caused to rotate in a predetermined relation of speed and direction of rotation with respect to each other, a plurality of discs with flat surfaces freely rotatable about individual axes, said flat surfaces contacting both of said raceways in tractive rolling contacts, a carrier supporting said individual axes so arranged that all of said axes are positioned in one plane parallel to and interspaced between the planes of rotation of said two raceways, a power transmitting connection between said carrier and the other of said shafts, and control means for axially shifting said carrier relative to said race ways whereby the position of said plane of said disc axes is changed relative to said planes of rotation of said race ways.

6. In a variable ratio transmission system, a driving and a driven shaft, two race ways of identical diameters independently rotatable about a common geometrical axis at a predetermined spacing from each other, a direct drive connection between one of said race ways and one of said shafts, a power transmitting connection having a predetermined changeable ratio between said same shaft and the other of said race ways, at least one flat disc freely rotatable about an axis perpendicularly intersecting said common axis and in tractive rolling contact with both of said race ways, a carrier supporting said disc axis freely rotatable about the common axis of said race ways and means slideably connecting said carrier to the other of said shafts.

7. In a variable ratio transmission system, two co-axially spaced rotatable race ways, a driving and a driven shaft, means in driving connection with one of said shafts adapted to cause said race ways to maintain a predetermined relation of speed and direction of rotation with respect to each other, at least one freely rotatable coupling element in tractive rolling contact with each of said race ways and having its axis of rotation positioned between said spaced race ways, a carrier for said coupling element, said carrier being rotatable co-axially with said race ways, control means connected to said carrier adapted to cause a change of the ratio of rotational speed between said carrier and at least one of said race ways and a driven shaft connected to said carrier.

8. In a variable ratio transmission system, a carrier rotatable about an axis, a disc with a flat surface being supported by said carrier rotatable about the center of said disc so that the flat surface of the disc is substantially parallel to the axis of said carrier, two co-axially rotatable members, each of said members having a peripheral race way with a diameter substantially equal to twice the distance between said flat surface of the disc and the axis of said carrier, means adapted to cause tractive rolling contact between said race ways and said flat disc surface substantially in two points of said surface which are spaced from each other and positioned upon a straight line through the center of rotation of said disc and which line is parallel to said axis of said carrier, driving and driven shafts, a power-transmitting connection between one of said shafts and said carrier, means for transmitting rotary power in predetermined selective ratio and direction of rotation individually between each of said co-axially rotatable members and another of said shafts, whereby said tractive rolling contacts transmit to said disc surface in each of said contact points a speed vector of predetermined size and direction, and control means adapted to vary the position of said center of rotation of the disc relatively to said points.

9. A variable ratio transmission system, comprising a carrier rotatable about an axis and a plurality of freely rotatable bodies mounted upon said carrier, each of said bodies having a substantially flat surface and being rotatable upon an individual axis, all of said last named axes being positioned in one common plane and so as to intersect the axis of said carrier in one common point, said flat surfaces being positioned substantially symmetrically with respect to said common point, two independently rotatable race ways co-axial with said axis of said carrier and in tractive rolling contact with the flat surfaces of said rotatable bodies, means for maintaining the tractive rolling contact between said race ways and the flat surfaces of said bodies, control means for changing the axial position of said common plane of said axes with respect to said race ways, a driving and a driven shaft, a power transmitting connection between one of said race ways and one of said shafts, a modulating power transmitting connection between the same said shaft and the other of said race ways whereby said co-axial race ways are caused to rotate at a predetermined relation of speed and direction of rotation with respect to each other, and a power transmitting connection between said driven shaft and said carrier.

10. In a variable ratio transmission system, a driving and a driven shaft, a pair of race ways of substantially equal diameters co-axially spaced from each other and independently rotatable about their common axis, torque transmitting connections between one of said shafts and each of said race ways, at least one of said connections including independently operable control means for modulating speed and direction of rotation of the respective race way, at least one differential member having a substantially flat surface and being rotatable about an axis perpendicularly intersecting said common axis, said flat surface positioned to maintain tractive rolling contact with each of said race ways, a carrier supporting said differential member for free planetary motion about said common axis, and power transmitting means between said carrier and the other of said shafts.

11. In a variable ratio transmission system, two co-axially spaced independently rotatable race ways, a driving and a driven shaft, means in driving connection with one of said shafts and at least one of said race ways adapted to maintain a predetermined relation of speed and direction of rotation of said race ways with respect to each other, at least one freely rotatable differential coupling element in tractive rolling contact with each of said raceways and having its axis of rotation positioned perpendicular to that of said spaced race ways, a carrier including journalling means for rotatably supporting said coupling element, means supporting said carrier rotatable about the common axis of said co-axial race ways, an axially slidable power transmitting connection between said carrier and said driven shaft, and means adapted to vary the axial position of the axis of rotation of said coupling element relatively to said race ways.

12. A variable ratio transmission system comprising, an input shaft, an output shaft, two drive wheels of equal diameters mounted for rotation about a common axis, means providing a continuous driving connection between said input shaft and both of said drive wheels, a differential wheel in continuous tractive rolling contact with both of said wheels, said differential wheel being mounted for free rotation about a further axis intersecting said common axis, and means connected to said differential wheel for transmitting the rotational movement of said further axis with respect to said common axis to said output shaft.

13. A transmission system according to claim 12, wherein said means providing said continuous driving connection includes means for causing said drive wheels to rotate in opposite directions and at a predetermined difference of speed.

14. A transmission system according to claim 12 wherein said means providing said continuous driving connection includes an independently operable control means for varying the relation of speed and direction of rotation between said two drive wheels during the operation of said transmission system whereby the sensitivity of the speed control of said system may be altered without causing a change in the transmission ratio between said driving and said driven shaft.

15. A transmission system according to claim 12 wherein said axes are mutually perpendicular and said differential wheel is mounted for axial displacement of said further axis along said common axis, and said means providing said continuous driving connection including control means operable independently of said displacement of said further axis for varying the relation of speed and direction of rotation of at least one of said drive wheels with respect to the said input shaft during the operation of said transmission system whereby the control characteristic of said system may be altered without interrupting the transmission of power through said system.

16. A variable ratio transmission system, comprising an input shaft, two co-axially aligned drive wheels of equal diameters, means providing a continuous driving connection between both of said wheels and said input shaft, an output shaft axially aligned with said drive wheels, a differential wheel carried by said output shaft for rotation therewith, said differential wheel being mounted for free rotation about an axis intersecting the rotational axis of said aligned shafts, and means maintaining said differential wheel in continuous tractive engagement with both of said drive wheels.

17. A variable ratio transmission system according to claim 16, wherein said differential wheel has a substantially flat face in tractive rolling engagement with said drive wheels and its rotational axis is displaceable axially of said shafts for varying the ratio of said transmission system, said means providing said driving connection between said drive wheels and said input shaft including means for reversing the direction of rotation of one of said drive wheels with respect to the other.

References Cited by the Examiner
UNITED STATES PATENTS
1,576,399   3/26   Aymard _____ 74—691
FOREIGN PATENTS
452,422   8/36   Great Britain.

DON A. WAITE, *Primary Examiner.*